United States Patent [19]
Coker et al.

[11] 3,871,668
[45] Mar. 18, 1975

[54] VACUUM SEALS

[76] Inventors: John Norman Coker, 21 Scallows Close, Three Bridges, Sussex; Basil Dixon Power, 3 Mount Close, Pound Hill, Sussex, both of England

[22] Filed: Aug. 2, 1973

[21] Appl. No.: 385,082

[30] Foreign Application Priority Data
Aug. 4, 1972  Great Britain.................... 36639/72

[52] U.S. Cl.................. 277/180, 277/195, 277/199
[51] Int. Cl............................................ F16j 15/00
[58] Field of Search .......... 277/195, 180, 211, 199, 277/185, 166

[56] References Cited
UNITED STATES PATENTS
3,342,501  9/1967  Meyer................................ 277/180

| | | |
|---|---|---|
| 3,717,351 | 2/1973 | Liebig................................. 277/185 |
| 3,720,420 | 3/1973 | Jelinek et al....................... 277/199 |
| 3,721,452 | 3/1973 | Black................................. 277/211 |

Primary Examiner—Samuel B. Rothberg
Attorney, Agent, or Firm—Dennison, Dennison, Townsend & Meserole

[57] ABSTRACT

A seal for insertion between opposed flanges of vacuum equipment incorporates a split support gripping the outer periphery of an elastomeric sealing ring. The support is recessed to accommodate bolts and clamps urging the flanges together, thus spreading the pressure.

4 Claims, 5 Drawing Figures

3,871,668

VACUUM SEALS

This invention relates to vacuum-tight seals between separable components of vacuum equipment.

More particularly, the invention relates to vacuum sealing members of the type comprising a carrier ring of metal or other rigid material secured to a sealing ring of elastomeric material. The sealing ring is thicker in the axial direction than the carrier ring so that when the sealing member is positioned between opposing flanges of components to be joined together in a vacuum-tight manner and the carrier ring is brought into engagement with the flanges, the sealing ring is compressed to form a vacuum-tight seal with the flanges.

In vacuum sealing members of this type, it has been proposed to secure the sealing ring to the carrier ring by chemical bonding of the elastomeric material to the inner circumference of the carrier ring. Not all elastomers have the property of being chemically bondable to metal and this places a restraint on the choice of material for the sealing ring. Moreover, if either the sealing ring or the carrier ring is damaged, the whole member has to be discarded.

It has also been proposed to mould elastomeric material about an annular web integral with the carrier ring and extending radially inwardly therefrom, the web being folded over on itself to form in cross-section a hook-shaped element which serves to anchor the sealing ring. As with the chemically bonding method, the whole unit must be discarded if either the carrier ring or the sealing ring is damaged.

It is an object to this invention to provide a vacuum sealing member comprising a carrier ring and a sealing ring which can readily be dismantled for replacement of either part.

Accordingly the present invention provides a vacuum sealing member which is as claimed in the appended claims.

To ensure accurate assembly of the two half carriers, locating means may be provided for locating or latching the two half carriers together. The locating means may comprise a plurality of complementary pegs and sockets spaced uniformly around the carrier ring, each half carrier having pegs alternating with sockets which register with alternating sockets and pegs, respectively, in the other half carrier. Each peg is preferably a wedge or other tight fit in its opposing socket, so that the two halves become latched together until deliberately separated.

With such arrangement of the sealing member, the two halves of the carrier ring can be readily separated from one another and from the sealing ring for replacement by a new part should either the carrier ring or the sealing ring become defective.

The flanged members of the vacuum system which are to be coupled together with the interposed sealing member are usually fastened by means of bolts extending through the flanges or by screw-threaded clamps. In order to provide clearance for such fastening means, three or more recesses may be provided extending inwardly from the outer circumference of the carrier ring and spaced uniformly therearound. The recesses may be notches affording clearance for the bolts, or they may be pockets wide enough circumferentially for the reception of clamps. Both recesses and pockets may be provided in alternating sequence.

The present invention will now be described by way of example with reference to the accompanying drawings, in which.

Figure 1:
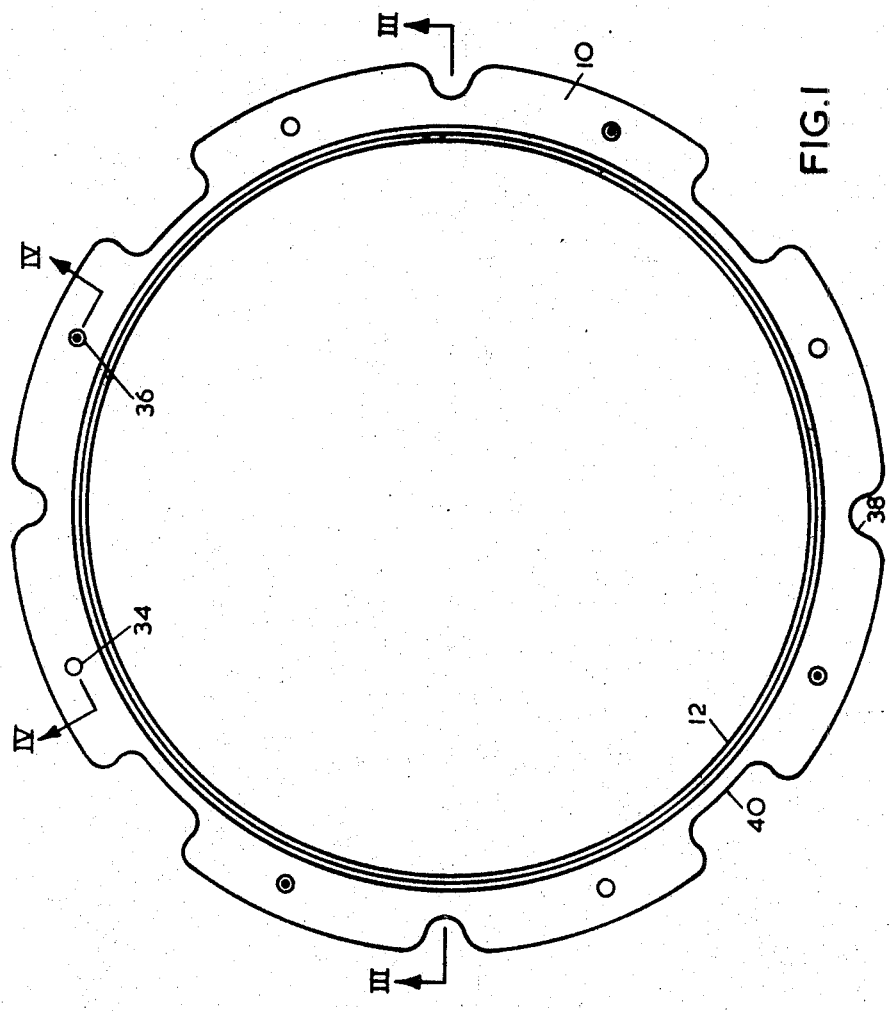
FIG. 1 is a plan view of a sealing member of the present invention.

Referring to the drawings, the sealing member of this invention consists of a carrier ring 10 and a sealing ring 12. The ring 10 consists of two identical half rings 14 and 16. Each half ring has two planar side surfaces 18 and 20 of which the surfaces 18 mutually abut and of which the surfaces 20 abut, respectively, with the opposing flanges of the components of a vacuum system (not shown) which are to be sealed together in a vacuum-tight manner. The surface 18 of each half ring has formed in it a L-sectioned annular groove 22 such that when the two half rings are assembled in face-to-face relationship, the grooves 22 together form in cross-section a T-shaped recess shown in FIG. 2. Obviously the recess formed between the two halves of the carrier ring, could have other shapes: what is common to all alternatives is that the recess has a relatively-narrow neck portion so that a radially-outermost flange or bead of the sealing ring is gripped securely.

Figure 2:
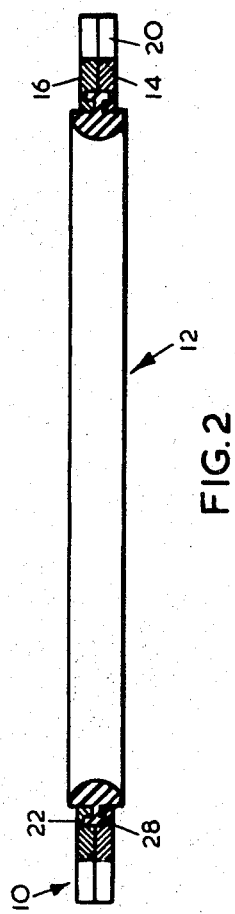
FIG. 2 is a diametrical cross-section of the sealing member shown in FIG. 1.
Figure 3:
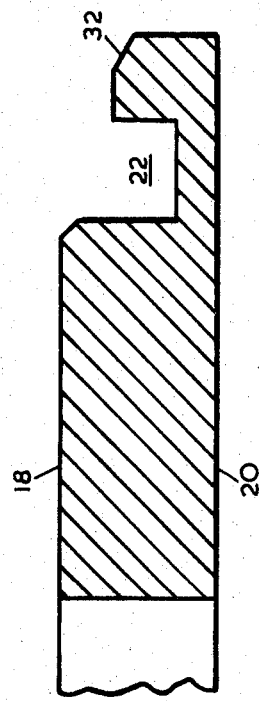
FIG. 3 is an enlarged fragmentary cross-section of FIG. 1 on the line III — III.

The sealing ring 12 has sealing surfaces 24 and 26 which, when the sealing member is mounted in operative position, engage and form a vacuum-tight seal with the opposed flanges of the components to be coupled together. Extending radially outwardly from the ring 12 in the diametric plane thereof is an integral sectioned flange 28 which fits into the T-shaped recess which is formed when the two half rings 14 and 16 are put together to form the complete sealing member as shown in FIG. 2. To improve the resistance to shear, the stem of the T-shaped flange may be tapered, as at 30, to mate with a complementary chamfer 32 on the T-shaped recess.

Figure 4:
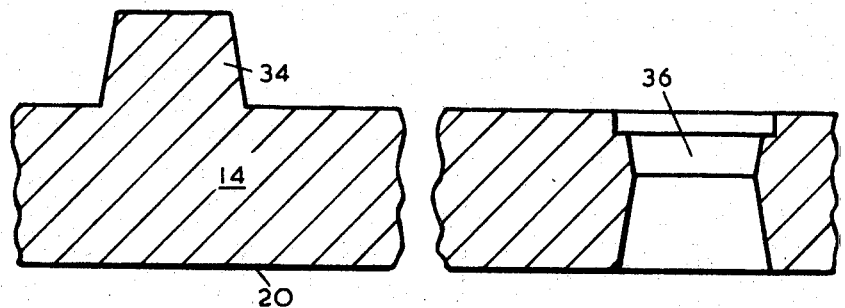
FIG. 4 is an enlarged fragmentary cross-section of FIG. 1 on the line IV — IV.
Figure 5:
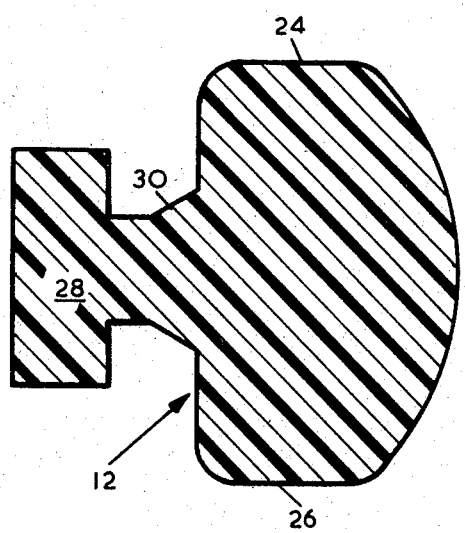
FIG. 5 is a cross-section of the sealing ring on an enlarged scale.

To ensure the accurate assembly of the two half rings in face-to-face relationship, locating means in the form of pegs 34 and sockets 36 are provided at uniformly-spaced intervals around each half ring. The pegs and sockets are arranged in alternating sequence so that the pegs of one half ring can be brought into register with the sockets of the other half ring, and vice versa. The pegs and sockets have complementary tapers as shown in FIG. 4. The material of the carrier ring can have sufficient resilience to cause each peg to become wedged in its socket when the two are urged together sufficiently firmly. The resultant latching action resists accidental or inadvertent separation of the two halves.

The flanges of the vacuum system which are to be coupled together with the interposed sealing member are usualy fastened by means of bolts extending through the flanges, or by screw-threaded clamps. In the embodiment shown in FIG. 1, four clearance notches 38 for bolts and four clearance pockets 40 for clamps are provided extending inwardly from the outer circumference of the carrier ring 10. The notches and pockets are arranged in alternating sequence at uniform intervals.

When sealing member 10, assembled as shown in FIG. 2, is positioned between flanges which are to have a vacuum-tight joint between them, the flanges are forced together by bolts or clamps until they contact the planar surfaces 20 of the two half rings 14 and 16. The depth of the sealing ring 12 is greater than the distance between surfaces 20 of the half rings 14 and 16, so that the sealing surfaces 24 and 26 come into firm, vacuum-tight, engagement with the flanges respectively to be sealed. At the same time, the surfaces 18 of the two half rings are firmly pressed, together, to grip the outer flange of the sealing ring and prevent it from being displaced radially inwardly under atmospheric pressure. Because the joint between the carrier ring 10 and the sealing ring 12 is mechanical only, the materials for the sealing ring and the backing ring can be chosen for their intended purposes, so that a wider range of materials is available than when the choice has to be restricted to materials which are able to be chemically bonded together.

An additional advantage of the sealing member of the present invention is that if either the carrier ring or the sealing ring becomes damaged or otherwise requires to be replaced, then the connection between the two is easily separable to permit the defective member to be replaced by an undamaged member with the obvious advantage of economy.

The carrier ring 10 may be of metal, but for many purposes it will be sufficient to make it of a mouldable plastics material such as nylon or ABS (acrylobutadienestyrene). A preferred material for sealing ring 12 is the elastomer sold under the trade name "Viton". This is a material which is particularly suitable for vacuum purposes in that its rate of out-gassing is acceptably low under high vacuum and yet it possesses the necessary resiliency to establish a vacuum-tight seal. Viton cannot be chemically bonded to metal, and the construction and assembly of the sealing member as described herein enables this highly suitable material to be used for the sealing ring.

What we claim is:

1. A vacuum sealing member comprising a continuous carrier ring of rigid material and a sealing ring of elastomeric material, said carrier ring comprising a pair of substantially identical continuous separable complementary half carriers mutually abutting face to face and each half carrier including in radial section a continuous groove, the two grooves together forming in radial section a T-shaped recess in the carrier ring, said sealing ring having sealing surfaces extending beyond the aggregate thickness of said half carriers and including means extending radially outwardly therefrom in the diametric plane defining an annular flange of complementary radial section to the recess in the carrier ring to secure the sealing ring when the two carrier halves are brought together in mutual abutment and latching means integral with said half carriers for aligning and joining the two half carriers with respect to each other.

2. A vacuum sealing member as claimed in claim 1 wherein the latching means comprise a plurality of complementary pegs and sockets spaced uniformly around the carrier ring, each half carrier having pegs alternating with sockets which register with alternating sockets and pegs respectively in the other half carrier.

3. A vacuum sealing member as claimed in claim 2 wherein each peg is a friction fit in its opposing socket so that the two halves become latched together until deliberately separated.

4. A vacuum sealing member as claimed in claim 1 wherein at least three recesses extending inwardly from the outer circumference of the carrier ring are spaced there-around to afford clearance for fastening means coupling the two flange components of the vacuum system between which the sealing member is interposed.

* * * * *